L. ROSEN.
PROPELLING MEANS.
APPLICATION FILED DEC. 20, 1909.

993,275.

Patented May 23, 1911.

2 SHEETS—SHEET 2.

Witnesses:
Carl R. Aberle
B. G. Richards

Inventor:
Louis Rosen
by Joshua R. H. Potts
his Attorney.

UNITED STATES PATENT OFFICE.

LOUIS ROSEN, OF CHICAGO, ILLINOIS.

PROPELLING MEANS.

993,275.

Specification of Letters Patent.  Patented May 23, 1911.

Application filed December 20, 1909. Serial No. 534,208.

*To all whom it may concern:*

Be it known that I, LOUIS ROSEN, a subject of the Czar of Russia, residing at Chicago, county of Cook, and State of Illinois, have invented certain new and useful Improvements in Propelling Means, of which the following is a specification.

My invention relates to improvements in propelling means especially adapted for use in propelling vehicles or boats, and has for its object the production of simple and efficient manually operated propelling means.

The invention consists in the combination and arrangement of parts hereinafter described and claimed.

Figure 1:
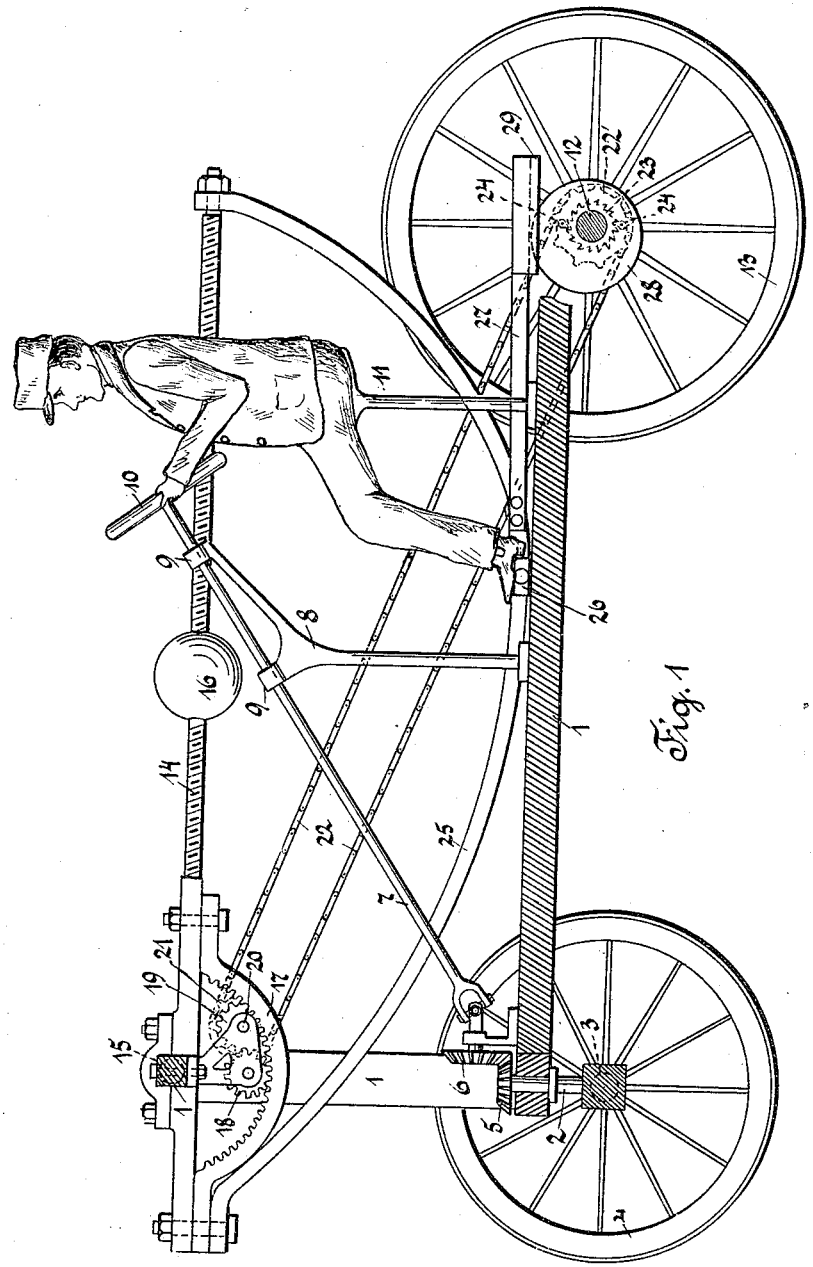
Figure 2:
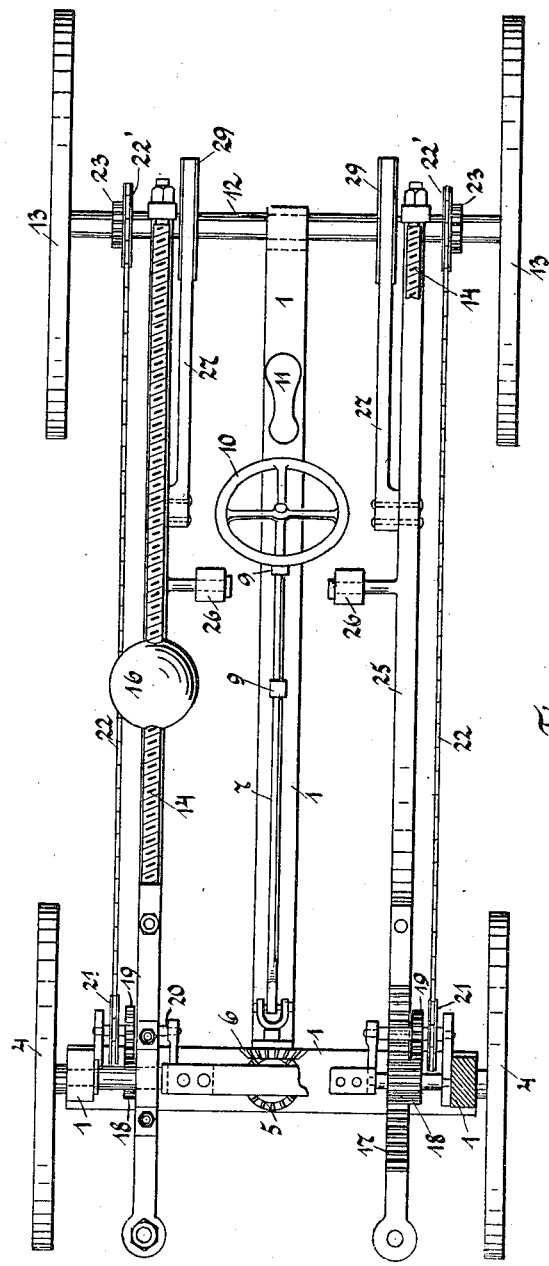

The invention will be best understood by reference to the accompanying drawings forming a part of this specification, and in which, Figure 1 is a sectional elevation of a wagon embodying my invention, and Fig. 2 is a top plan view of the same with parts broken away and removed.

The preferred form of construction as illustrated in the drawings comprises a suitable frame adapted to support the driving mechanism and an operator. At its front the frame 1 is pivoted on a vertical shaft 2 carried centrally by the front axle 3 on which front wheels 4 are rotatably mounted. At its upper end shaft 2 carries a bevel gear 5 meshing with a bevel gear 6 having a universal joint connection with a steering rod 7. Steering rod 7 is supported in a suitable standard 8 having bearings 9 therefor. At its upper end rod 7 carries a hand wheel 10 in convenient position for manipulation by an operator seated upon the seat 11.

At the rear the frame 1 is supported upon a rotatable axle 12 carrying supporting wheels 13 fixed thereto. A pair of horizontally disposed operating levers 14 are fulcrumed in frame 1 as at 15 and carry adjustable weights 16 screw threaded thereon. Each of said levers carries a segment gear 17 secured thereto coaxially with fulcrum 15. Elongated gears 18 are mounted in suitable brackets on frame 1 and mesh with segment gears 17 for a portion of their length. The other portions of gears 18 mesh with driving gears 19 fixed to shafts 20 which carry sprocket wheels 21. Sprocket wheels 21 are connected by means of sprocket chains 22 with sprocket wheels 22' loosely mounted on rear axle 12. Ratchet wheels 23 are fixed to axle 12 adjacent sprocket wheels 22' and pawls 24 are provided on sprocket wheels 22' to engage ratchet wheels 23 and cause intermittent driving connections between their sprocket wheels and said axle. Each of the levers 14 is provided with a downwardly extending bow member 25 carrying pedals 26 located in operative relation to seat 11. Rearwardly extending bearing members 27 are secured to bows 25 and rest upon eccentrics 28 fixed to rear axle 12. Each of the bearing members 27 is provided with downwardly extending side plates 29 adapted to engage over the sides of said eccentrics to retain said bearing members in operative contact therewith.

By the construction as above set forth it will be observed that upon alternate depressions of levers 14 by means of pedals 26 sprocket wheels 22' will be driven in a forward or counter-clockwise direction during the downward motion of said levers and in the opposite direction during upward motion of said lever. This forward motion of the sprocket wheels will be communicated to supporting wheels 13 by means of pawls 24 thus serving to propel the wagon in a forward direction. Eccentrics 28 serve to elevate levers 14 during their inoperative stroke and are set on axle 12 in opposed angular position so as to cause alternate operations of said levers.

By adjusting weights 16 away from the fulcrums of their levers the initial starting of the wagon is facilitated thus rendering the device adjustable to the relative strengths of operators. By adjusting weights 16 to different distances on their respective levers the said levers may be adjusted to the relative strengths of the different legs of the operator.

To start the device the operator may elevate the operating levers with his arms and depress said levers. This will serve to start the device and when once started pressure applied to the pedals will continue the motion. To insure freedom of action the gearing connecting with the rear axle should be such as to cause the eccentrics to travel at a high enough speed to prevent interference with the downward movements of the operating levers.

While I have illustrated and described the preferred form of construction for carrying my invention into effect the same is capable of different applications such as to boats, juvenile wagons, etc. I, therefore, do not wish to be limited to this specific application of the device or to the details of construction as set forth in the drawing, but desire to avail myself of such variations and modifications as come within the scope of the appended claims.

Having described my invention what I claim as new and desire to secure by Letters Patent is:

1. A propelling device comprising a frame, a wheeled running gear for said frame comprising an axle having wheels secured thereto; a pair of levers fulcrumed in said frame, an internal segment gear secured to each of said levers co-axially with its fulcrum; an elongated gear having a portion meshing with said segment gear; a driving gear meshing with the other portion of said elongated gear; a sprocket driven by said driving gear; a sprocket loosely mounted on said axle; a pawl and ratchet connection between said last named sprocket and said axle; a sprocket chain passing over said sprockets; pedals on said levers; means on said axle for alternately elevating said levers; and a seat for an operator located in operative proximity to said pedals, substantially as described.

2. A propelling device comprising a frame; a wheeled running gear for said frame comprising an axle having wheels secured thereto; a pair of levers fulcrumed in said frame; an internal segment gear secured to each of said levers co-axially with its fulcrum; an elongated gear having a portion meshing with said segment gear; a driving gear meshing with the other portion of said elongated gear; a sprocket driven by said driving gear; a sprocket loosely mounted on said axle; a pawl and ratchet connection between said last named sprocket and said axle; a sprocket chain passing over said sprockets; pedals on said levers, oppositely disposed eccentrics on said axle; bearing members secured to said levers and bearing upon said eccentrics; and a seat for an operator located in operative proximity to said pedals, substantially as described.

3. A propelling device comprising a frame; a wheeled running gear for said frame comprising an axle having wheels secured thereto; a pair of horizontally disposed levers fulcrumed in said frame; adjustable weights on said levers; an internal segment gear secured to each of said levers co-axially with its fulcrum; an elongated gear having a portion meshing with said segment gear; a driving gear meshing with the other portion of said elongated gear; a sprocket driven by said driving gear; a sprocket loosely mounted on said axle; a pawl and ratchet connection between said last named sprocket and said axle; a sprocket chain passing over said sprockets; pedals on said levers; oppositely disposed eccentrics on said axle; bearing members secured to said levers and bearing upon said eccentrics; and a seat for an operator located in operative proximity to said pedals, substantially as described.

In testimony whereof I have signed my name to this specification in the presence of two subscribing witnesses.

LOUIS ROSEN.

Witnesses:
HELEN F. LILLIS,
JOSHUA R. H. POTTS.

---

Copies of this patent may be obtained for five cents each, by addressing the "Commissioner of Patents, Washington, D. C."